(12) United States Patent
Mahrholz et al.

(10) Patent No.: US 10,822,666 B2
(45) Date of Patent: Nov. 3, 2020

(54) METHOD FOR OBTAINING CRYSTALS FROM A MOTHER SOLUTION, AND CRYSTALLIZATION DEVICE SUITABLE FOR THIS PURPOSE

(71) Applicant: BMA Braunschweigische Maschinenbauanstalt AG, Braunschweig (DE)

(72) Inventors: Jens Mahrholz, Braunschweig (DE); Andreas Lehnberger, Braunschweig (DE)

(73) Assignee: BMA Braunschweigische Maschinenbauanstalt AG, Braunschweig (DE)

(*) Notice: Subject to any disclaimer, the term of this patent is extended or adjusted under 35 U.S.C. 154(b) by 0 days.

(21) Appl. No.: 16/070,860

(22) PCT Filed: Jan. 25, 2017

(86) PCT No.: PCT/EP2017/051493
§ 371 (c)(1),
(2) Date: Jul. 18, 2018

(87) PCT Pub. No.: WO2017/129590
PCT Pub. Date: Aug. 3, 2017

(65) Prior Publication Data
US 2019/0024196 A1    Jan. 24, 2019

(30) Foreign Application Priority Data
Jan. 25, 2016   (DE) .................. 10 2016 101 217

(51) Int. Cl.
*C13B 30/02*    (2011.01)
*B01D 9/00*    (2006.01)

(52) U.S. Cl.
CPC .......... *C13B 30/025* (2013.01); *B01D 9/0036* (2013.01); *B01D 9/0063* (2013.01); *C13B 30/027* (2013.01); *B01D 2009/0086* (2013.01)

(58) Field of Classification Search
CPC ...... B01D 9/0063; B01D 9/00; B01D 9/0036; C13B 30/02; C13B 30/027; C13B 30/025
(Continued)

(56) References Cited

U.S. PATENT DOCUMENTS

| 4,155,774 A | 5/1979 | Randolph | |
|---|---|---|---|
| 2004/0258589 A1* | 12/2004 | Golovanoff | B01D 9/0063 422/245.1 |

(Continued)

FOREIGN PATENT DOCUMENTS

| DE | 23 11 231 | 9/1974 |
|---|---|---|
| DE | 34 20 001 | 12/1985 |

(Continued)

OTHER PUBLICATIONS

A.R. Sapronov, "Technology of Sugar Production," Mockba konoc 1999, pp. 268-295
(Continued)

*Primary Examiner* — Claire A Norris
(74) *Attorney, Agent, or Firm* — Salter & Michaelson

(57) ABSTRACT

A method for obtaining crystals from a mother solution operates such that mother solution is fed into a crystallisation device. Supersaturation of the mother solution is brought about by open and/or closed-loop control of the temperature ($\square$). Seed crystals are added to the mother solution at a seeding point (Sp). The seed crystals are grown as nuclei by continuous closed-loop process control and are finally removed from the method as crystals. They form the product yield. The formation of crystal nuclei in the mother solution is countered by steps in the closed-loop process (Continued)

control. During the closed-loop process control and the crystallisation procedure, the position of the limit (M) of the formation of secondary nuclei is determined using sensors that detect data currently, wherein the position of the limit (M) is established as a value of the concentration (c) and the temperature (☐) from these data. This determined position of the limit (M) of the formation of crystal nuclei is used as the basis for the closed-loop process control of the crystallisation.

16 Claims, 5 Drawing Sheets

(58) Field of Classification Search
USPC .................. 117/201, 16, 60, 15, 30; 127/58
See application file for complete search history.

(56) References Cited

U.S. PATENT DOCUMENTS

| | | | |
|---|---|---|---|
| 2011/0155665 A1* | 6/2011 | Cohen | B01D 61/022 210/638 |
| 2013/0199439 A1* | 8/2013 | Spano | C30B 7/00 117/68 |
| 2014/0261396 A1* | 9/2014 | Tay | C13B 30/025 127/16 |
| 2015/0017085 A1 | 1/2015 | Britton et al. | |

FOREIGN PATENT DOCUMENTS

| | | |
|---|---|---|
| DE | 38 31 305 | 3/1990 |
| DE | 699 25 660 | 3/2006 |
| EP | 0 370 365 | 5/1990 |
| EP | 0 945 158 | 9/1999 |
| EP | 2 778238 | 9/2014 |
| RU | 2 048 526 | 11/1995 |
| RU | 2 252 967 | 5/2005 |
| RU | 2 264 471 | 11/2005 |
| WO | 01/56956 | 8/2001 |

OTHER PUBLICATIONS

K.E. Austmeyer; T. Frankenfeld, "Die radiometrisch erfasste Dichte als Messgrosse fur den Kochprozess," Zuckerindustrie, (1985), vol. 110, No. 2, pp. 122-130.

L. Rozsa, "On-line monitoring and control of supersaturation and other massecuite parameters in vacuum pans: A control engineering approach," International Sugar Journal, (Ausgabe NR. 1356), (2011), vol. CXIII, pp. 853-862, XP002732969.

Senso Tech: Kristallisationsuberwachung: Inline-Analysenmesstechnik fur Sattigungsgrad, Ubersattigung, Kristallgehalt, metastabiler Bereich, Partikelgrosse. (Mar. 2015), 1-24-Firmenschrift.

Z. Q. Yu et al., "Recent Advances in Crystallization Control," Chemical Engineering Research and Design, Elsevier, Amsterdam, NL, (Jan. 1, 2007), vol. 85, No. 7, doi:10. 1205/CHERD06234, ISSN 0263-8762, pp. 893-905, XP02252677 [A] 1-19 * Feedback Control Based on PSD Measurements; pp. 897-898.

Vincenzo Liotta et al., "Monitoring and Feedback Control of Supersaturation Using ATR-FTIR to Produce an Active Pharmaceutical Ingredient of a Desired Crystal Size," Organic Process Research and Development, US (May 1, 2004), vol. 8, No. 3, doi:10.1021/0p049959n, ISSN 1083-6160, pp. 488-494.

Mitsuko Fujiwara et al., "Paracetamol Crystallization Using Laser Backscattering and ATR-FTIR Spectroscopy: Metastability, Agglomeration, and Control," Crystal Growth & Design, (Aug. 10, 2002), vol. 2, No. 5, pp. 363-370.

Xiang-Yang Zhang et al., "Chrystallization of zinc lactate in presence of malic acid," Journal of Crystal Growth, Elsevier, Amsterdam, NL, vol. 312, No. 19, ISSN 0022-0248, (Sep. 15, 2010), pp. 2747-2755.

Abdulsamad Tadayyon et al., "Control of Fines Suspension Density in the Fines Loop of a Continuous KCL Crystallizer Using Transmittance Measurement and an FBRM Probe," The Canadian Journal of Chemical Engineering, (Aug. 2000), vol. 78, pp. 663-673.

* cited by examiner

METHOD FOR OBTAINING CRYSTALS FROM A MOTHER SOLUTION, AND CRYSTALLIZATION DEVICE SUITABLE FOR THIS PURPOSE

TECHNICAL FIELD

The invention relates to a method for obtaining crystals from a mother solution, in which mother solution is fed into a crystallisation device, in which supersaturation of the mother solution is brought about by open and/or closed-loop control of the temperature, in which seed crystals are added to the mother solution at a seeding point, in which the seed crystals are grown as crystal nuclei by continuous closed-loop process control and are finally removed from the method as crystals and form the product yield, in which the formation of crystal nuclei in the mother solution is countered by steps in the closed-loop process control. The invention also relates to a crystallisation device suitable for carrying out the method.

BACKGROUND OF THE INVENTION

In particular when obtaining sugar, but also in the case of other carbohydrates or sugar alcohols, in an important method step crystals, thus for example sugar crystals, are obtained from a mother solution (also called a mother liquor) by crystallisation. The mother solution is previously prepared by processing sugar beet or sugar cane, and then a supersaturation is brought about in this mother solution, for which purpose the temperature is controlled to be at a suitable level. Seed crystals are fed into the supersaturated mother solution and then, with an appropriate closed-loop process control, for example at a falling temperature in the case of crystallisation by cooling or at a constant temperature in the case of crystallisation by evaporation, these grow accordingly and form the desired sugar crystals.

Here, care must be taken at all times that a supersaturation of the mother solution is present. Without supersaturation of this kind, the seed crystals cannot grow, but rather, in the case of undersaturation, are even dissolved over time.

The sugar crystals then form the product yield and are removed from the method.

Here, it is in particular desirable in the interests of further processing for the obtained sugar crystals all to be in approximately the same size, since this simplifies further processing. The attempt is made to achieve this in that, when the sugar crystals are produced, there are involved only the seed crystals that are introduced.

In practice, however, so-called primary nuclei are additionally formed from the mother solution itself. Moreover, so-called secondary nuclei are formed by the effect of the seeding material out of the mother solution and the crystal material. These primary nuclei and secondary nuclei are then the basis for further sugar crystals. However, because crystal formation begins later, these sugar crystals that do not grow from the introduced seed crystals are smaller and are thus, as so-called fines, problematic for further processing later, in particular for centrifuging—that is to say the separation of the mother solution and the crystal material. Moreover, as a result of the sugar dust produced from the fine crystals, the risk of dust explosion increases. For these reasons, it is thus desirable where possible to avoid the formation of these primary nuclei and secondary nuclei.

Primary nuclei and secondary nuclei of the above-mentioned type are grouped together under the term "crystal nuclei" in the text below.

Various approaches have been made to avoiding the formation of such crystal nuclei. In the sector of the sugar industry, crystallisation processes rely on a special open-loop process control for which a particular reference variable is used in each case.

Thus, for example, in DE 23 11 231 C3 and DE 34 20 001 A1 it is proposed that the magma viscosity be used as the reference variable. As an alternative, K. E. Austmeyer and T. Frankenfeld propose, in "Die radiometrisch erfasste Dichte als Messgröße für den Kochprozess [Radiometrically determined density as a measurement variable for the boiling process]", in *Zuckerindustrie* 110 (1985) 2, pages 122 to 130, that magma density be used as a reference variable. In both cases, the crystallisation process is controlled by means of the reference variable for characterising the total content of dry substance by empirical specifications such that ultimately the nucleation process does not take effect in the crystallisation by cooling or evaporation, so a supersaturation that is critical for nucleation is avoided. This is designated as the so-called best practice concept.

The terms "concentration" and "content of dry substance" are both indications of content. Here, the term "concentration" is understood in particular to mean the mass concentration. This describes the mass of the dissolved substances in relation to the total volume of the solution. In solubility graphs, it is conventional to use the term "concentrations".

In particular in the sugar sector, another variable is preferably used for describing an indication of content, namely the dry substance, frequently abbreviated to DS. The content of dry substance is a mass content. It describes the mass of dissolved solids in relation to the total mass of the solution. This is advantageous for many calculations in the sugar industry.

L. Rozsa gives a critical analysis of the values proposed as reference variables in the sugar sector, in "On-line monitoring and control of supersaturation and other massecuite parameters in vacuum pans: A control engineering approach", in *International Sugar Journal*, Vol. CXIII, issue No. 1356 (2011), pages 853 to 862.

The recent literature describes not only possibilities for open-loop process control but also examples of closed-loop process control. In these examples, supersaturation is a mathematical variable based on certain specifications such as the solubility curve and initial purity of the solution. Data for the supersaturation that is critical for nucleation must also be specified.

Thus, for example, EP 2 778 238 A2 proposes that the saturation in the mother solution be limited to a very specific range of values. L. Rozsa proposes a closed-loop process control with online monitoring and control of the supersaturation. For this, the specifications mentioned are required.

All the proposals from the prior art thus have the disadvantage that a supersaturation that is critical for nucleation must always be specified for the crystallisation process.

The company brochure of Sensotech GmbH, "Kristallisationsüberwachung [Monitoring Crystallisation]", from March 2015, proposes an inline analytical measuring technique in which a crystallisation process is monitored. This relates to industrial-scale crystallisation processes in which, before the crystallisation process is carried out, it is known exactly which substance is in a crystallisation device and how the acoustic velocity and concentration behave in dependence on the temperature of this substance. This is envisaged for comparatively pure salt solutions in which the values of the associated saturation curve during a crystallisation procedure are thus known exactly before a crystallisation procedure is carried out. This makes it possible, by measuring a parameter, to establish during a crystallisation procedure whether the solution in the crystallisation device is in the metastable region, or how far this solution is from the saturation curve if a corresponding calibration has been performed beforehand.

This procedure is suitable for crystallising solutions in which highly precise information is already available before the crystallisation procedure, as is the case for many comparatively high-purity salt solutions. This procedure is not applicable to the crystallisation of sugar, however. In this case, the properties of the mother solution fluctuate from one batch to the next, nor are they predictable in practice. There are many foreign bodies and organic impurities in mother solutions of this kind, so it is not possible to make the assumptions required for a prediction.

DE 38 31 305 C2 is likewise concerned with the crystallisation of salt solutions, in particular potassium salt solutions, and proposes a crystallisation by cooling for these. In this concept too the attempt is made to achieve a largely uniform crystal material. A further proposal is known from EP 0 945 158 B1, in which a crystallisation by cooling is used to obtain as uniform a particle size distribution as possible.

However, the physical and chemical properties of mother solutions are in many cases highly variable, as mentioned above. They depend on external constraints, the quality or indeed the type of preparatory steps for preparing the mother solution. The actual course of the method also has the effect that the conditions vary within a crystallisation device while the method is running. For this reason, there exists a series of empirical and also theoretical considerations as to how the crystallisation takes place, which constraints apply in a crystallisation vessel at a particular moment, and how the difficult decision on the temperatures and concentrations at which the method is to be run within the crystallisation vessel should be taken.

It has already been recognised that when the concentration is very high and the degree of supersaturation consequently rises, there is an increased tendency for undesirable crystal nuclei to be formed in the mother solution. The attempt is therefore made to operate where possible at values that lie only very slightly above the boundary between supersaturation and undersaturation, also designated the saturation curve. This has the effect that crystal nuclei are prevented from forming in a really highly reliable manner. It goes without saying that the attempt must be made to observe this constraint of supersaturation as accurately as possible, or in any case to overshoot the saturation curve and yet to overshoot it only to as small an extent as possible.

Although this procedure is successful, it is ultimately unsatisfactory to those skilled in the art, and there remains room for improvement.

It is therefore an object of the present invention to propose a method for obtaining crystals from a mother solution, in which the method steps make possible more rapid crystallisation with as little formation of crystal nuclei as possible, even with sugar and other substances that are crystallised from mother solutions that are not pure or are of low purity.

It is a further object to propose a crystallisation device that is suitable for carrying out the method.

SUMMARY OF THE INVENTION

The first object mentioned is achieved in the case of a generic method by means of the invention in that, during the continuous closed-loop process control and while the method is running, in the mother solution data are currently determined by sensors, in that from these data the position of the limit (M) of the formation of crystal nuclei is determined while the method is running, as a value of the concentration (c) and the temperature (A), and in that this current determined position of the limit (M) of the formation of crystal nuclei is used as the basis for the closed-loop process control of the crystallisation.

In this manner, and unexpectedly for those skilled in the art, an improvement in conducting the method is in fact possible. Instead of the considerations and complicated mathematical models hitherto, which focused on determining the boundary between supersaturation and undersaturation in as exact and precise a manner as possible, which then permitted an estimated extent of excursion into the supersaturation range which was as small as possible, now a boundary or limit that was hitherto not even included in the detailed considerations is determined in a quite deliberate manner.

In fact, there is formed above the saturation curve—that is to say the boundary between supersaturation and undersaturation—a metastable region having values for the concentration of the mother solution and temperature in which no crystal nuclei have yet been formed, since the constraints for nucleation do not yet prevail. Thus, in this region only a growth of already existing crystal nuclei but not yet a formation of new crystal nuclei is possible, for physical reasons.

The interesting point here is that as the distance from the boundary between undersaturation and supersaturation increases—that is to say as the concentration increases—so the rate at which the existing crystals produced from the original seed crystals grow increases. This is understandable, since as a result of the increasing supersaturation more sugar molecules are available for crystallisation.

There is thus a zone in which the formation of crystal nuclei is only just below the level where it is possible but at the same time gives a more rapid growth of sugar crystals compared with the region directly below the saturation curve. This zone is already at a certain distance from the saturation curve—that is to say the boundary with undersaturation. However, this distance is by no means large. As a result of determining the position of this zone relatively exactly, the closed-loop process controls can be performed such that it is specifically this region that is targeted and so the sugar crystals are obtained at an accelerated pace without the undesirable side effects.

In the metastable region above the saturation curve, where there is not yet any new formation of crystal nuclei, there is thus not only the saturation curve itself, which forms the lower limit of the metastable region in respect of the concentration, but also an upper limit. Whereas in the prior art activity was in a part of this region that lies—and indeed, hitherto had to lie—relatively close to the saturation curve, according to the invention activity is instead in a partial region or zone that is as closely adjacent as possible to the upper limit of the metastable zone.

In this zone within the metastable region that is now utilised, the possibility of the formation of crystal nuclei is still virtually ruled out but at the same time crystal growth is already markedly accelerated.

The sensors that are used according to the invention are preferably sensors for optical signals. As an alternative or indeed in addition, sensors for ultrasound, radar and microwaves and indeed other measurement variables may also be used.

A particular advantage of the invention lies in the fact that, for the first time, it enables critical saturation states to be determined online in a manner available to sensors, which also has consequences in respect of an improvement in performance of the method from the point of view of control engineering.

It is particularly preferable if the crystals are carbohydrates or sugar alcohols. A particularly advantageous economic use of the method is possible in this industrial sector.

It is advantageous if the optical signal is generated by an interaction of electromagnetic radiation with the crystal nuclei and this is detected in particular as turbidity.

Of interest here is not only the entire signal from which nucleation is detectable but also the differential signal between crystals as a background signal and additional crystal nuclei. The derivative of the signal may also deliver useful information. It is possible to process the optical signals obtained in this way in the most diverse ways, and they may be used as constituent parts of the optical signal which are usable in control engineering, to improve the method.

Further, it is preferable if the position of the limit (M) of the formation of crystal nuclei is determined using a light scattering measurement as turbidity, a reflectance measurement, in particular by laser, in the form of a focused beam reflectance measurement (abbreviated to FBRM), or using imaging methods, in particular using microscopes, online in the crystallisation device.

These process-analytical tools have proved particularly useful in determining the boundary of the metastable region. Because, when measuring the turbidity, the intensity and direction of scattered light depend not only on the concentration and size distribution of the particles but also on the shape and surface texture and on optical parameters, among others the refractive index of the particles, in this preferred embodiment of the method a distinction between different crystal materials is also possible within certain limits.

In the invention, the nucleation limit is determined periodically in the industrial crystallisation process of carbohydrates and sugar alcohols. It is possible to utilise this in a self-training method for closed-loop control of the crystallisation. The nucleation limit at the same time represents the upper limit of the metastable zone. The measurements can be performed under real conditions in the respective crystallisation device using the selected and available sensors.

As a result of the invention, better account can be taken of the individual and indeed time-variable system conditions of the crystallisation device. This is true of the embodiments in respect of construction and process engineering, just as much as it is of the quality of different raw materials containing carbohydrates, for example sugar beet and sugar cane.

The numerical values of supersaturation that were required hitherto, and knowledge of the position of the saturation curve in dependence on the purity of the solution, are no longer needed. Nor do drifting purity levels or non-sugar components of the mother solution during the campaign pose problems any more, but may be taken into account automatically as factors affecting the nucleation limit.

The nucleation limit is not a system constant. It is validated at regular intervals and, depending on the validation, then adapted to closed-loop control of the crystallisation. This allows the crystallisation process always to be carried out in optimum manner. This gives a constantly current and in particular optimum operating point, typically just below the upper limit of the metastable zone.

This is particularly relevant in respect of the very important seeding point, since it is here that the crystallisation process can easily move into the unstable region in respect of control engineering. The seeding point is the point on the graph of concentration and temperature at which the seed crystals are deployed.

The method according to the invention also has the advantage that it is possible to dispense with the complex and expensive microwave measurement used at present, for determining the magma dry substance content. Instead, an inexpensive and less complex combination according to the invention is used to determine and control the limit of nucleation and the associated content of dry substance in the mother solution. In a preferred embodiment, this is done by a combination of a turbidity sensor and a process refractometer.

Using the invention, an optimum space-time yield of the crystallisation devices is achieved. The processes carried out become more economic.

The improvement in crystal quality that is achieved with the invention is manifested as an improvement in crystal distribution, in which the content of fines—that is to say secondary crystals from secondary nuclei—that has otherwise to be accepted no longer arises. This brings with it an improvement in the separation of crystals in centrifuges, with an increased product yield.

The invention is preferably used in a method in which the mother solution is fed into the crystallisation device in batches. However, a continuous process may also be performed.

In a preferred embodiment of the method, these possibilities can be utilised in that optical and other signals are utilised for determining the position of the limit of the formation of crystal nuclei, wherein in respect of the formation of crystal nuclei these signals a) are evaluated in a discontinuous operation during a batch, wherein the result of evaluation has an effect on the closed-loop control variables during processing of the batch or on the subsequent crystallisation batch, or b) are evaluated in a continuous operation over a period of time, wherein the result of evaluation has an effect on the closed-loop control variables for a subsequent period of time.

Both types of operation in this way make it possible to optimise the obtaining of crystals from a mother solution.

Further improvements are possible if the optical and other signals are captured and evaluated as a function of time.

Here, it is useful to proceed in such a way that the type of optical and other signals is selected such that they are characteristic of the formation of crystal nuclei of carbohydrates or sugar alcohols.

Evaluation of the optical and other signals and their course over time may also be used in the form of the method according to the invention to draw a conclusion about the time of nucleation and/or the rate of nucleation.

In various preferred embodiments, the position of the limit of nucleation is determined using iterative approximation.

It is preferable if, in addition, the method is also used to monitor and evaluate over time the success of the cleaning of crystallisation devices by so-called steaming out, which is necessary periodically to remove or prevent encrustations. In particular, the question of when the cleaning process in a crystallisation device is required and hence should be performed may become recognisable in this way.

A crystallisation device that is suitable for achieving the second object mentioned and that is suitable for carrying out the method according to the invention is characterised by sensors for determining the position of the limit of the formation of crystal nuclei.

Here, it is preferable if the sensor is located in a region of the device that is not disturbed by the formation of bubbles.

It is further preferable if the sensor or sensors are arranged below a heating chamber.

DESCRIPTION OF THE DRAWINGS

Further preferred features of the invention are specified in more detail in the subclaims and in the description of the Figures that follows.

The invention is explained below in more detail with reference to the drawing, in which.

DETAILED DESCRIPTION

In a crystallisation process in a crystallisation device, crystal nuclei from which crystals of the desired kind are to grow are introduced into a mother solution in a targeted manner at a seeding point.

Figure 1:
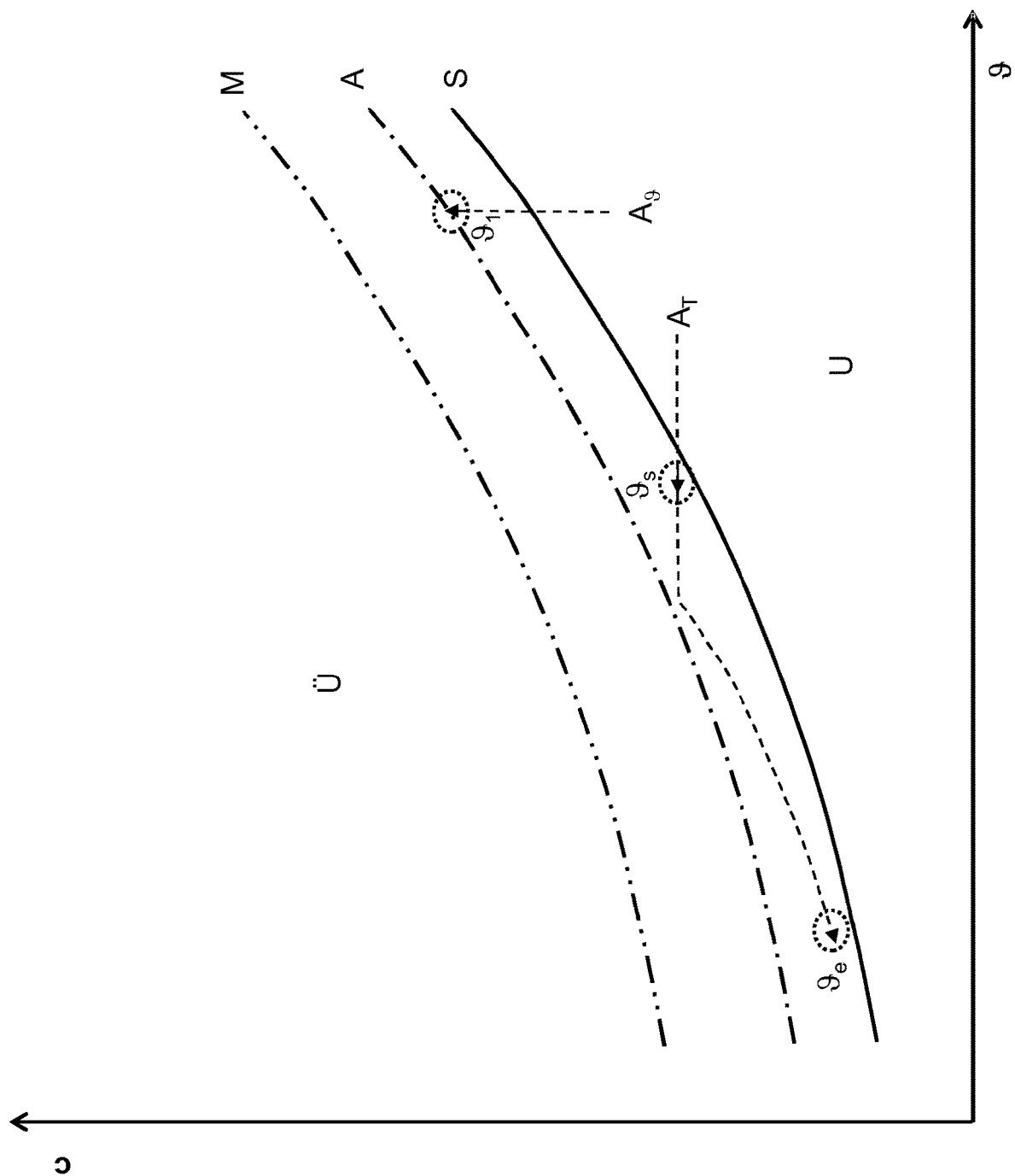
FIG. 1 shows a schematic illustration of the limit curves for seeded crystallisation processes in a crystallisation device.

FIG. 1 represents in principle how the values for the mother solution for a crystallisation process in a crystallisation device behave. For this purpose, a temperature $\theta$ for the mother solution is represented on the x axis and a concentration c on the y axis. It can be seen that at high temperatures and low concentration an undersaturation is formed in the region U, in which crystals that are present are dissolved. Here, the mother solution is therefore liquid and no formation of solid sugar crystals is possible.

At a high concentration c and relatively low temperatures $\theta$, by contrast, a supersaturated region U is produced. Here, sugar crystals that are present grow as a result of the high concentration in their environment, and moreover the formation of fines is also possible. This region is unstable since the mother solution has a tendency to crystallise.

Between the undersaturated region U and the supersaturated region U there is a saturation curve S forming the boundary.

Moreover, markedly above the saturation curve S there is a metastable limit M for the formation of crystal nuclei. In the region between the saturation curve S and the metastable limit M, seed crystals that are already present as a result of the supersaturation present can grow, but no new sugar crystals can be formed because the constraints required for nucleation are not met.

In the prior art, there was a tendency to prevent the formation of crystal nuclei as far as possible in that, although it was necessary to keep above the saturation curve S in order to enable any growth of sugar crystals at all, this saturation curve S was kept to as closely as possible. It was not permitted to overshoot an empirically determined operating point A, or in any case it had to be observed as closely as possible.

Also on this operating curve A there is for example an operating point $\theta_1$ for crystallisation by evaporation. Here, the seeding point is not shown.

Further indicated is a typical operating curve $A_T$ for crystallisation by cooling. Lowering the temperature, indicated by a horizontal line, brings the crystallisation device above the saturation curve S and the starting point close thereto, at a starting temperature $\theta_s$, and this is estimated by continuously reducing the temperature until just before the operating curve A, obtained from empirically determined values, is reached. Then the concentration c is also reduced so that this operating curve A is not overshot. This reduction in the concentration c is produced by depleting the mother solution as a result of crystallisation. The method is then terminated at a temperature $\theta_e$.

The operating curve A lies markedly below the metastable limit M in order to reliably prevent crystal nuclei from arising or fines from resulting.

Figure 2:
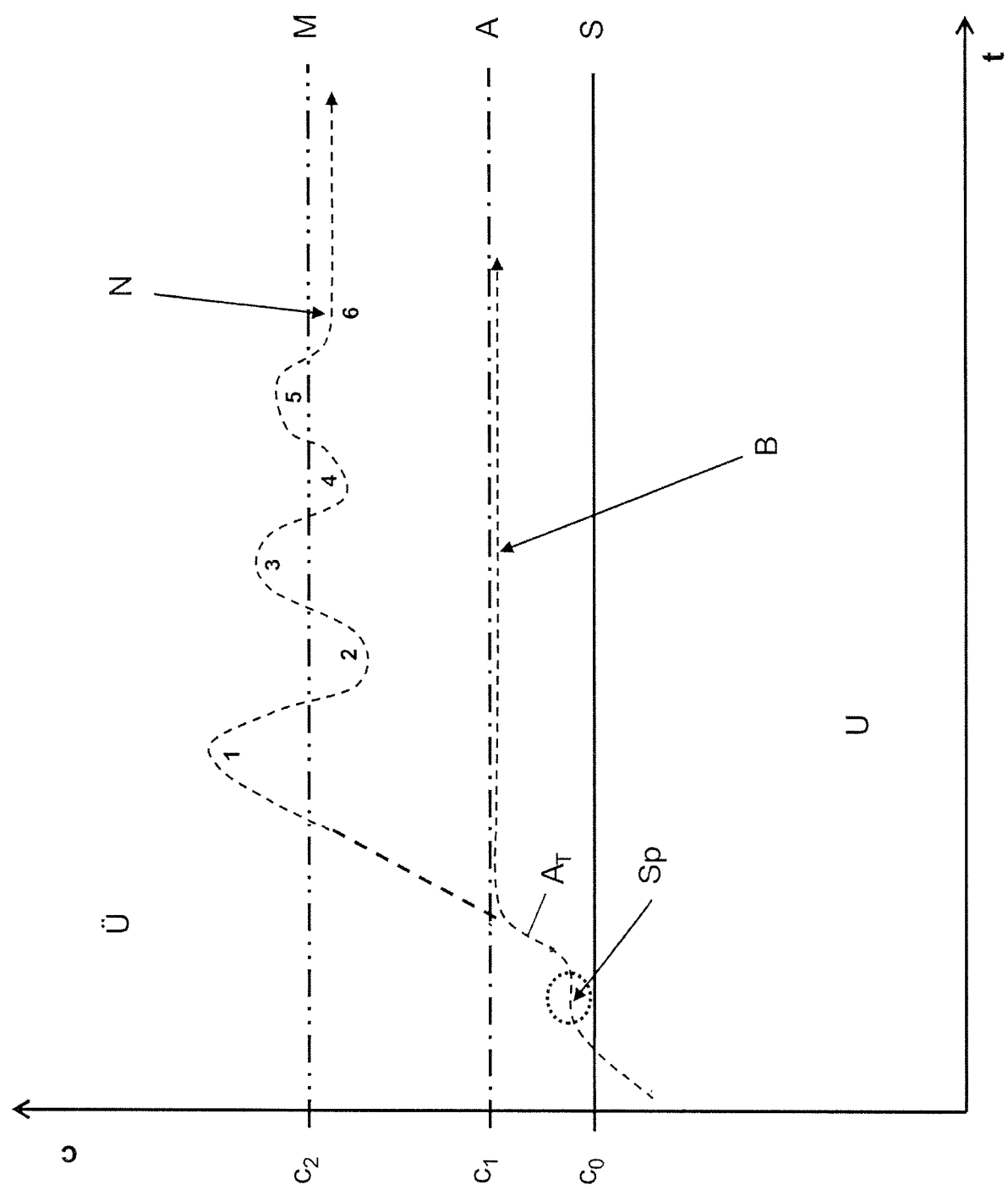
FIG. 2 shows a schematic illustration of the conditions during crystallisation by evaporation, in a one-batch process.

FIG. 2 now represents the conditions in a similar form, wherein in this case time t is indicated on the x axis and concentration c is again indicated on the y axis.

When one considers the course of the method $A_T$, it is initially of identical values and runs on the left, as seen in this representation, over the saturation curve S, of concentration $c_0$, to the seeding point Sp. From there, the concentration increases further with time, as can also be seen in FIG. 1, until the operating curve A, of concentration $c_1$, has been entirely reached. Then the curve $A_T$ bends away in conventional manner and runs just below the operating curve A, which consequently in practice forms the limit concentration B in the supersaturation of the prior art.

In a method according to the invention, this does not happen, but rather the curve rises further, above the operating curve A of concentration $c_1$. Over time, the concentration $c_2$ is finally exceeded. Now, sensors (not illustrated) establish that crystal nuclei are produced, and determine from this that the metastable limit M for the formation of crystal nuclei has undoubtedly been overshot. This recognition is immediately utilised now, in a next step, to reduce the concentration until it has again fallen far enough for no more formation of crystal nuclei to be observable. This is the case between the metastable limit M and the moment on the operating curve A that is marked 2. From a control engineering point of view, the reduction in concentration is ended at this moment designated 2. The method can now proceed until the concentration $c_2$ is overshot again.

In this embodiment of the method according to the invention, this procedure then continues to be monitored iteratively within a single batch until the respective measurements quite clearly show where the metastable limit M for the formation of crystal nuclei actually lies.

In the representation, the assumption is made that this recognition has been reached at the iterative step 6, and from that point this value, recognised as more or less the optimum, is maintained for the concentration c, with the result that an optimised limit concentration N for the supersaturation is formed as the method continues to run.

Figure 3:
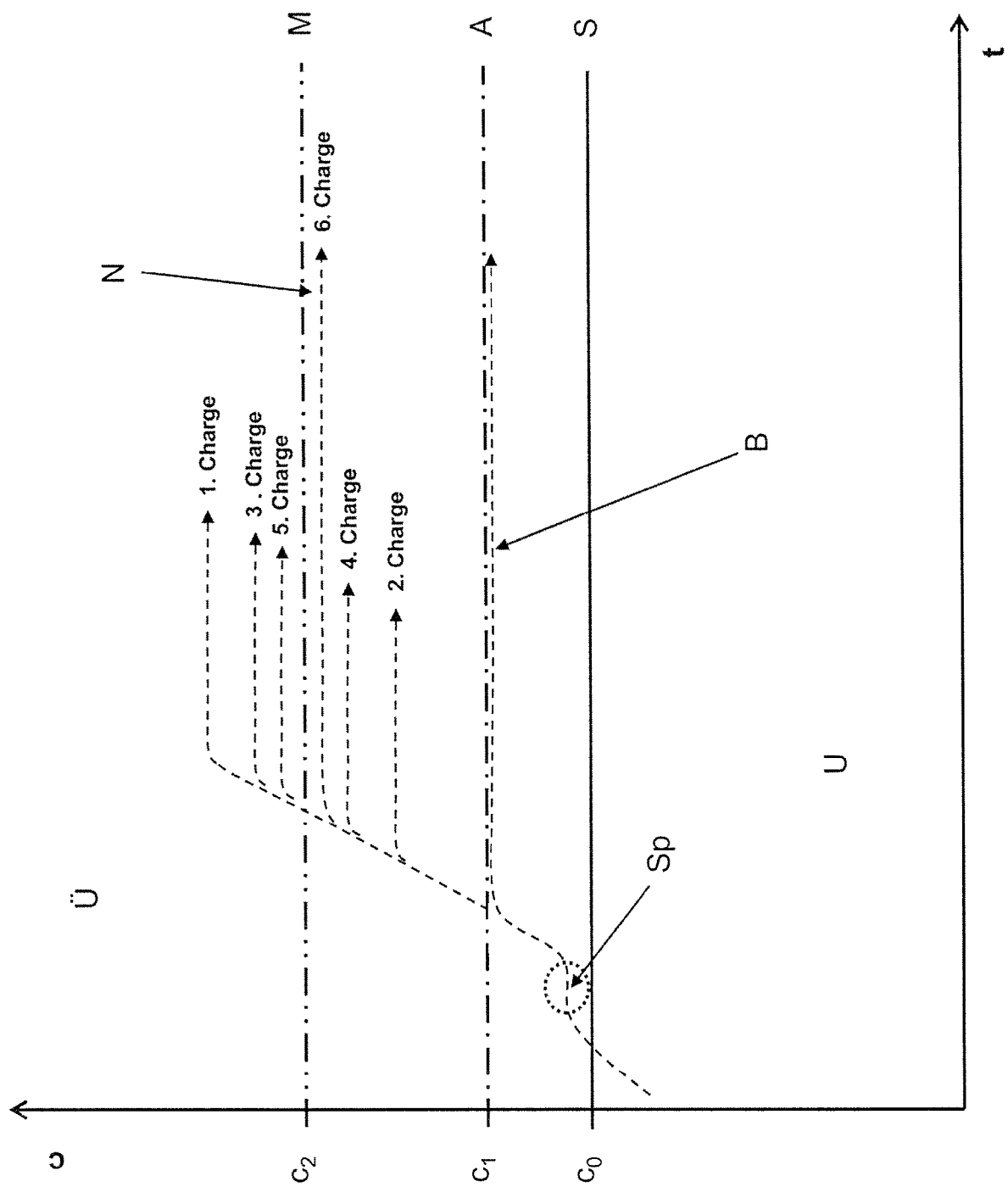
FIG. 3 shows a schematic illustration of the conditions during crystallisation by evaporation, in a multi-batch process.

FIG. 3 shows, in a similar form, an iterative sequence when a plurality of batches are used one after the other. The method of the prior art would once again be that having the limit concentration B of the prior art, just below the operating curve A of concentration $c_1$.

In this case, a certain value is assumed in each case within a batch. Thus, the first batch is not reduced to the metastable limit M again as in FIG. 2, but remains constant once it reaches a certain value and it is recognised that the metastable limit M of concentration $c_2$ has been overshot.

In a second batch this termination is carried out at a markedly lower value, and the recognition that no crystal nucleus at all has yet been formed is utilised for a higher value again for the third batch, and so on.

Figure 4:
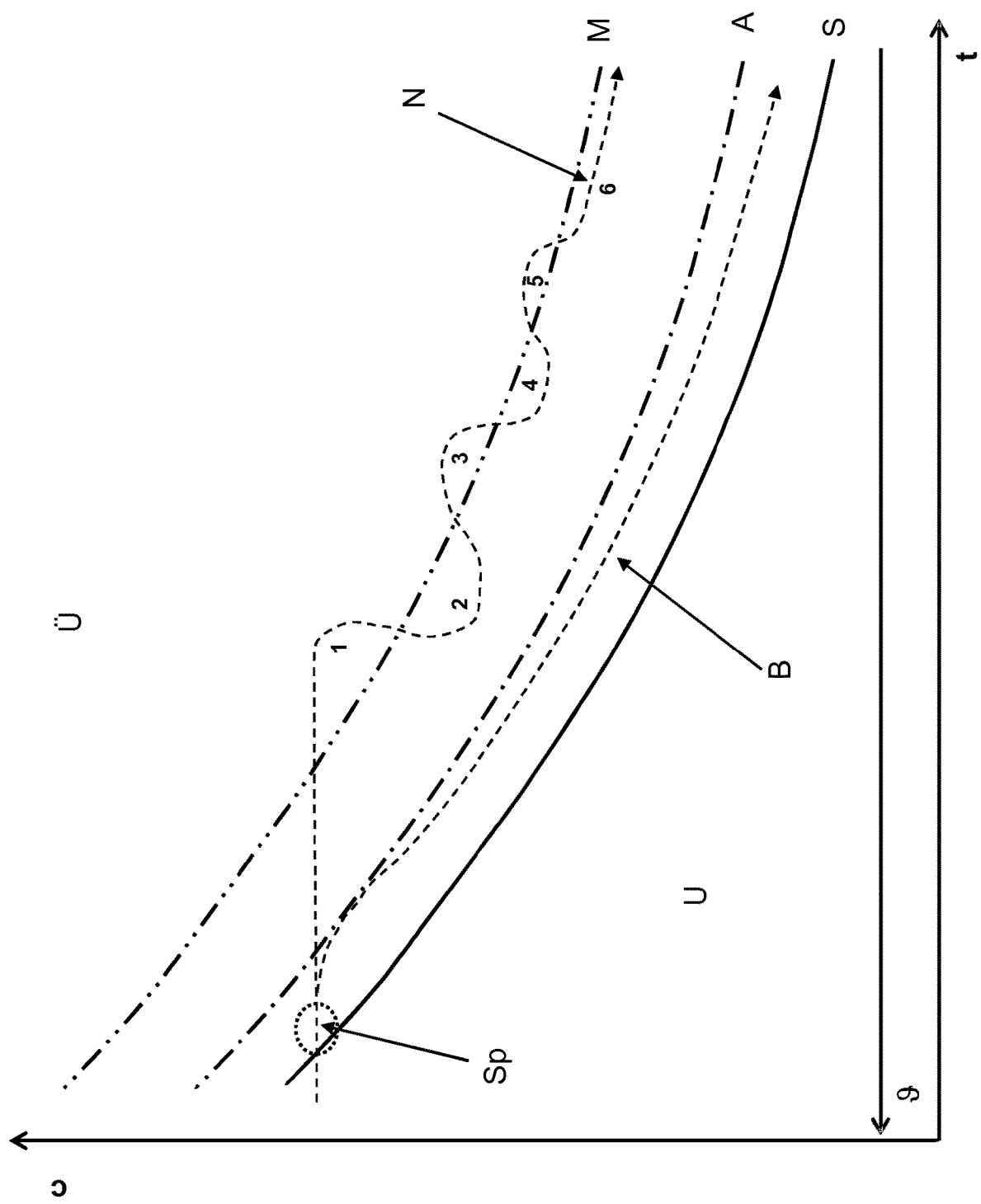
FIG. 4 shows a schematic illustration of the conditions during crystallisation by cooling, in a one-batch process.

FIG. 4 now represents schematically an iterative sequence of process steps in a single batch, in this case for crystallisation by cooling.

Unlike the representation in FIGS. 2 and 3, over time t the values of the temperature θ thus also decrease. Thus, temperature falls to the right. Here, the concentration c does not remain constant over time; however, the same curves and values also appear here—that is to say the undersaturation region U, the supersaturation region Ü, the saturation curve S that separates these two regions, and the metastable limit M for the formation of crystal nuclei, which is located at some distance above the saturation curve S.

Here too, an operating curve is indicated, which is iteratively approximated to this metastable limit M for the formation of crystal nuclei, within a single batch.

Figure 5:
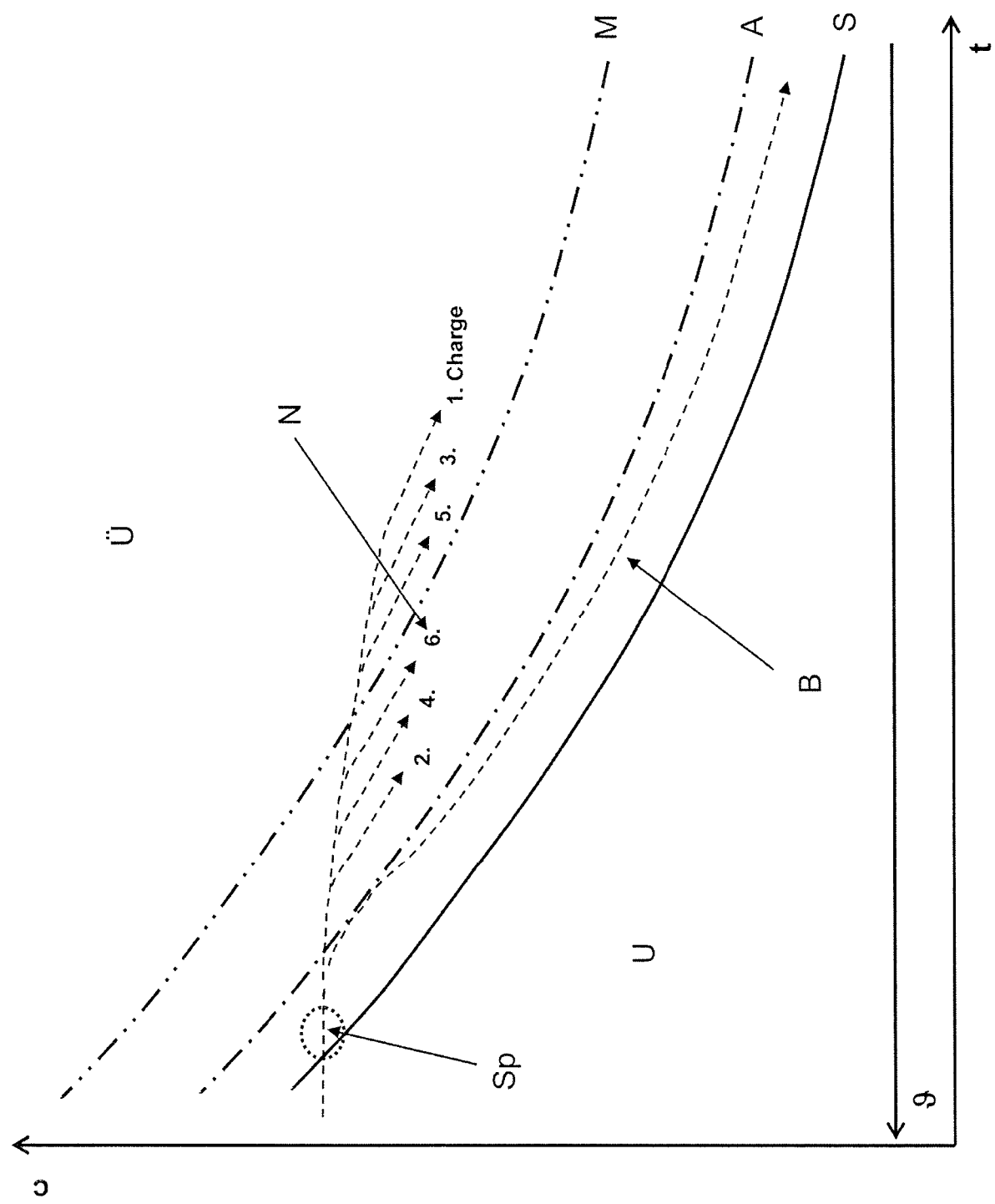
FIG. 5 shows a schematic illustration of the conditions during crystallisation by cooling, in a multi-batch process.

In FIG. 5, crystallisation by cooling takes place in a multi-batch process and, in a similar manner to that in FIG. 3, knowledge is acquired in each case from one batch to the next.

For this purpose, the cooling rate of the mother solution may be set to be successively higher from one batch to the next until the nucleation limit M is reached or overshot. The cooling rate of the mother solution may be reduced again somewhat once the nucleation limit M has been overshot and this overshooting has been recognised, with the result that in the next batch nucleation is only just no longer observed. Using this iterative process, it is possible to approximate to the upper limit of the metastable zone as the operating point. This is of particular interest at the seeding point Sp, since here there is a risk from a control engineering point of view that the process will move into the unstable region, and it is possible to counter this risk in a targeted manner.

The cooling rate of the mother solution that is associated with this operating point serves to specify a target value for the process. It should be monitored as the batch is run.

For determination of the position of the metastable limit M, various sufficiently sensitive process-analytical tools may be used, for example turbidity meters, a focused beam reflectance measurement (FBRM) or imaging methods, such as those using process microscopes.

Using one or more sensors for determining the nucleation limit M, in the sugar crystallisation sector it is possible to construct a self-training and self-optimising closed-loop control that improves the known closed-loop control concepts for a crystallisation batch.

In practice, in the sugar house of a refinery, for a product station—for example for white sugar—having a plurality of discontinuous crystallisation devices, only one device would be equipped in this way. If the crystallisation devices operating in parallel are of the same construction, the operating point that is identified can be applied to these devices. Closed-loop control there may then be performed using the known concepts, for example with the aid of mother solution dry substance values.

The dry substance values of the mother solution may for example be monitored using a process refractometer. In this context, this iterative process for determining the metastable limit M should be repeated periodically.

The principle is applicable to both continuous and discontinuous crystallisation by evaporation, and to continuous and discontinuous crystallisation by cooling.

LIST OF REFERENCE NUMERALS

A Operating curve
$A_T$ Typical operating curve for crystallisation by cooling
$A_θ$ Typical operating curve for crystallisation by evaporation for a constant temperature θ
B Limit concentration for supersaturation in the prior art
c Concentration
$c_0$ Concentration at the saturation point
$c_1$ Concentration at the operating point for crystallisation by evaporation
$c_2$ Concentration at the metastable limit for the formation of crystal nuclei
M Metastable limit for the formation of crystal nuclei
N New, optimised operating curve
S Saturation curve
Sp Seeding point
t Time
U Region of undersaturation
Ü Unstable region of supersaturation
θ Temperature
$θ_1$ Constant temperature value
$θ_s$ Starting temperature of $A_T$
$θ_e$ End temperature of $A_T$

What is claimed is:

1. A method for obtaining crystals from a mother solution,
   in which the mother solution is fed into a crystallisation device,
   in which supersaturation of the mother solution is brought about by closed loop control of the temperature (θ),
   in which seed crystals are added to the mother solution at a seeding point (Sp),
   in which the seed crystals are grown as crystal nuclei by continuous closed-loop process control and are finally removed from the method as crystals and form the product yield,
   in which the formation of crystal nuclei in the mother solution is countered by steps in the continuous closed-loop process control,
   characterised
   in that, during the continuous closed-loop process control and while the continuous closed-loop process control is running, in that the mother solution has mother solution data that are currently determined by sensors,
   in that from the mother solution data the position of the metastable limit (M) of the formation of crystal nuclei is determined while the method is running, as a value of a mass concentration (c) in the crystallisation device and the temperature (θ),
   in that this current determined position of the metastable limit (M) of the formation of crystal nuclei is used as the basis for the closed-loop process control of the crystallisation,
   in that, as the mass concentration rises over time, the mass concentration exceeds the metastable limit M as sensed by the sensors so as to establish that crystal nuclei are produced, and determine from this that the metastable limit M for the formation of crystal nuclei has been overshot, followed by a next step of reducing the mass concentration until it has fallen below the metastable limit M so that there is no more formation of crystal nuclei to be observable, in that there are multiple cycles of exceeding the metastable limit M followed by reducing the mass concentration, and in that after them multiple cycles the mass concentration is maintained at a level just below the metastable limit M.

2. A method according to claim 1,
characterised in that the crystals are carbohydrates or sugar alcohols.

3. A method according to claim 1,
characterised in that the mother solution is fed into the crystallisation device discontinuously in batches or continuously.

4. A method according to claim 3,
characterised in that optical signals and/or signals relating to ultrasound, radar and/or microwaves are utilised for determining the position of the limit (M) of the formation of crystal nuclei, wherein in respect of the formation of crystal nuclei these signals
a) are evaluated in a discontinuous operation during a batch, wherein the result of evaluation has an effect on the closed-loop control variables during processing of the batch or on the subsequent crystallisation batch, or alternatively
b) are evaluated in a continuous operation over a period of time, wherein the result of evaluation has an effect on the closed-loop control variables for a subsequent period of time.

5. A method according to claim 4,
characterised in that the optical signals and/or the signals relating to ultrasound, radar and/or microwaves are captured and evaluated as a function of time.

6. A method according to claim 4,
characterised in that the type of optical signals and/or signals relating to ultrasound, radar and/or microwaves is selected such that they are characteristic of the formation of crystal nuclei of carbohydrates or sugar alcohols.

7. A method according to claim 4,
characterised in that evaluation of the optical signals and/or the signals relating to ultrasound, radar and/or microwaves, including where appropriate their course over time, allows a conclusion to be drawn about the time of nucleation and/or the rate of nucleation.

8. A method according to claim 4,
characterised in that the position of the limit (M) of nucleation is determined using iterative approximation.

9. A method according to claim 4,
characterised in that the optical signals are generated by an interaction of electromagnetic radiation with the crystal nuclei and are detected as turbidity.

10. A method according to claim 1,
characterised in that the position of the limit (M) of the formation of crystal nuclei is determined using a light scattering measurement as turbidity, a reflectance measurement, by laser in the form of a focused beam reflectance measurement or using imaging methods, using microscopes, online in the crystallisation device.

11. A method according to claim 10,
characterised
in that the light scattering measurement is performed by means of a turbidity meter or nephelometer, and/or
in that the light scattering measurement is performed at different angles.

12. A method according to claim 4,
characterised in that the result of evaluation relating to the closed-loop control variables from parallel crystallisation processes operating in batches or continuously is in addition applied to other crystallisation devices.

13. A method according to claim 1,
characterised in that the results of evaluation are utilised in a self-training system for the purpose of online closed-loop control.

14. A method according to claim 4,
characterised in that, from the determined optical signals and/or the signals relating to ultrasound, radar and/or microwaves, the fact that crystals and/or crystal nuclei have diminished and/or disappeared is determined.

15. A method according to claim 1,
characterised in that, from determined values, an evaluation of the cleaning required for the crystallisation device is performed, in particular establishing that a cleaning process is required and/or establishing that a cleaning process can be considered to have been successfully completed.

16. A method according to claim 1,
characterised in that the sensors provide data to produce a self-training and self-optimising closed-loop control.

* * * * *